United States Patent [19]
Finnila et al.

[11] Patent Number: 5,953,468
[45] Date of Patent: Sep. 14, 1999

[54] SCALABLE, QUANTIZED, DELAY-LINE ARRAY BASED ON NESTED, GENERALIZED SPIRALS

[75] Inventors: Charles A. Finnila, Las Vegas, Nev.;
Antonio J. Mendez, El Segundo, Calif.

[73] Assignee: Mendez R&D Associates, El Segundo, Calif.

[21] Appl. No.: 09/019,179

[22] Filed: Feb. 5, 1998

Related U.S. Application Data

[63] Continuation-in-part of application No. 29/061,856, Nov. 1, 1996, abandoned.

[51] Int. Cl.$^6$ ....................................................... G02B 6/26
[52] U.S. Cl. ................................ 385/16; 385/16; 385/140
[58] Field of Search ........................................ 385/16, 140

*Primary Examiner*—Rodney Bovernick
*Assistant Examiner*—Robert E. Wise
*Attorney, Agent, or Firm*—Norton R. Townsley

[57] ABSTRACT

The present invention is a compact, quantized, photonic delay-line array based on nested, generalized, spirals. The array includes N optical waveguides and is quantized in that consecutive waveguides can have their delays differ by the same delay difference design constant, D. Thus the delay for the $n^{th}$ delay line can be expressed as $D_n = D_0 + n^*D$ where $D_0$ is the delay through the first waveguide and $n = 0, 1, 2, \ldots, (N-1)$. The arrays can be formed on a suitable substrate by a process permitting crossovers such as silica-on-silicon or optical polymer planar lightwave circuits. The nested waveguides are applied as single turn or multiturn generalized spirals with either sharp (mirrored) or rounded corners. The approach is scalable because N may range from 2 to over 64, limited only by the wafer (substrate) material and size, or D may range from a picosecond to well over a nanosecond with currently available substrates. With switching and optical combining such an optical waveguide array can provide one or several variable delays. In other applications, multiple, simultaneous optical channels can be given accurate increments of differential delay between channels.

19 Claims, 5 Drawing Sheets

SCALABLE, QUANTIZED, DELAY-LINE ARRAY BASED ON NESTED, GENERALIZED SPIRALS

CROSS REFERENCES

This application is related to and specifically incorporates the disclosures of the following Applications:

1. Docket AM5, titled "OPTICAL DELAY LINE", Ser. No. 29/061,856, filed Nov. 1, 1996.
2. Docket AM1, titled "WAVELENGTH DIVISION MULTIPLEXING/CODE DIVISION MULTIPLE ACCESS HYBRID", Ser. No. 08/828,030, filed Mar. 27, 1997

This application is a Continuation-in-Part of Docket AM5, titled "OPTICAL DELAY LINE", Ser. No. 29/061, 856, filed Nov. 1, 1996 now abandoned.

BACKGROUND OF THE INVENTION

The present invention relates to the field of optical data communication, computation, and data processing. More specifically the present invention relates to the more effective use of optical waveguides deposited on appropriate substrates to provide series of optical delay lines each line having longer delay than the last line by the same fixed constant. By optical switch selection of specific delay lines such optical delay networks can be used to provide commandable variable time delays such as can be used to coordinate the elements of phased array antennas for communication or radar applications. Alternately, optical delay networks can be used to time encode or decode pulse data. For example, many or all of the delay-lines can be used simultaneously to spread individual pulses into code division multiple access (CDMA) pulse patterns or to time correlate such pulse code patterns.

Various methods have been devised to provide time delays in optical data transmission. U.S. Pat. No. 5,109,466, issued to Kaltschmidt, describes a spiral optical waveguide formed of LiNbO3 deposited on a silicon substrate, the optical waveguide being interceptible at various points to detect an incoming signal at a predetermined delay. Secondary light waveguides in another plane guide light to the spiral delay line. The intent and design of the invention is for signal processing of incoming signals. The invention does not describe scalability, waveguide geometries with their design rules, nor the possibility of enhancing the real estate utilization by means of cross-over paths, nor the planar integration of functions, nor multiple inputs/multiple outputs.

U.S. Pat. No. 5,289,454, issued to Mohapatra, et al, describes a means, based on LiNbO3, or equivalent, switches, for directing a laser beam from one input to one of several outputs, or from one input to various outputs. The application is specifically for the interrogation of parallel data paths in an optical disk memory. The application does not require delays among the various branches of the tree topology. The switching is from within the structure of the invention.

U.S. Pat. No. 5,367,586, issued to Glance et al. on Nov. 22, 1994, describes a wavelength router, which is an optical wavelength analyzer, followed by a delay line array, which itself is followed by a wavelength combiner or coupler. The objective of the design is to stagger the sorted wavelengths by predetermined amounts prior to their being combined in a single output port. Thus, the input signals are sorted by wavelength and time slot.

U.S. Pat. No. 5,414,548 issued to Tachikawa et al. on May 9, 1995, describes an arrayed guide which is specifically designed to act as an optical wavelength sorter. This technique is an extension of the Dragone and Smit techniques for wavelength sorting or spectral analysis developed for telecommunications wavelength division multiplexing (WDM) wavelength sorting and routing.

U.S. Pat. No. 5,143,577 issued to Haas et al, describes a means of forming optical waveguides in optical polymers, such waveguides having a low loss property. Likewise, U.S. Pat. No. 5,519,803, issued to Shiono et al., describes a means to fabricate optical waveguides.

It is an objective of the present invention to provide a solid-state device based on optically transparent semiconductor or optical polymer materials capable of mapping an arbitrary set of inputs through a set of optical delays (ranging from about one picosecond to well beyond one nanosecond) to an arbitrary set of outputs. It is a further objective of the invention to accept multiple inputs and to distribute these to multiple outputs with a large dynamic range of delays, all delays being formed on a planar lightwave circuit by means of highly efficient, real estate conserving design algorithms. It is yet a further objective of the present invention that the delays of the invention be scalable structures usable by a control law and sometimes a set of external switches to effect various codes, states of a system, routes, etc. It is a still further objective of the invention that the topology of the structures be many-on-many to provide a wide variety of delay options independent of optical switching techniques, materials or processes. Finally, it is also an objective of the present invention that it can be fabricated with any of the techniques used to form optical waveguides of the kind described in the invention.

While some of the objectives of the invention can be found in the prior art, none of patents examined adequately satisfies all of the requirements described above.

L. Eldada, R. Scarmozzino, R. M. Osgood, Jr., D. C. Scott, Y. Chang, and H. R. Fetterman, "Laser-Fabricated Delay Lines in GaAs for Optically Steered Phased-Array Radar", J. Lightwave Technol., Vol. 13, p. 2034 (1995), show the construction of delay lines in an optically transparent semiconductor, the delay lines having an architecture of a single input split into multiple (8) outputs, each arm having a delta increase in delay, the right-hand arms having odd delays and the left-hand arms having even delays. The incremental delays were 3.4 ps. The splitting at each juncture was by means of an asymmetric coupling scheme.

M. -L. Wu, P. -L. Fan, J. -M. Hsu, and C. T. Lee, "Design of Ideal Structures for Lossless Bends in Optical Waveguides by Conformal Mapping", J. Lightwave Technol., Vol. 14, p. 2604 (1996), describe a methodology for designing curving optical waveguides in a planar structure which reduces the radiative losses of the waveguide.

L. Faustini, C. Coriasso, A. Stano, C. Cacciatore, and D. Campi, "Loss Analysis and Interference Effect in Semiconductor Integrated Waveguide Turning Mirrors", IEEE Photon. Technol. Lett. Vol. 8. p. 1355 (1996), describe the microscopic details of the turning mirrors for 90 degree turn optical waveguide structures to assure low loss turns.

R. Scarmozzino, "BeamPROP Version 2.0", RSoft, Inc., Montrose, N.Y., describes a computer aided design methodology and software for optimizing the optical transmission performance of complex optical waveguide structures made of optically transparent semiconductor or optical polymer processes and materials.

R. A Norwood. L. Eldada, S. Emo, J. Gustus, R. Rapoport, K. M. T. Stengel, L. W. Shacklette, C. Wu, C. Xu, and J. T.

Yardley, "Polymer Optical Interconnection Technology: Toward WDM Applications", WDM Components Conf., SPIE Vol. 2690, p. 151 (1996), describe the materials and processes for producing optical waveguide structures, including delay lines, in optical polymers rather than silica-on-silicon, or optically transparent semiconductor materials W. A. Wood, J. A. Chestnut, J. Hoffman, "Next Generation Shipboard Active-Array Radar Challenges", 7th Annual DARPA Symposium on Photonic Systems for Antenna Applications (PSAA-7), January, 1997, describe the requirements and applicable technologies for scalable delay line arrays in phased array radar applications.

SUMMARY OF THE INVENTION

The present invention is a compact, quantized, photonic delay line array based on nested, generalized, spirals. Each array includes N optical waveguides. It is quantized in the sense that consecutive waveguides in a specific array can have their delays differ by the same delay difference design constant, D. Then the delay for the $n^{th}$ delay line can be expressed as $$D_n = D_0 + n*D$$

where $D_0$ is the delay through the first waveguide and n=0, 1, 2, ..., (N-1).

The delay arrays can be formed on a suitable substrate or portion of substrate by a process permitting crossovers. For example, silica-on-silicon or optical polymer planar lightwave circuits can be used. The nested waveguides are applied as single turn or multiturn generalized spirals with either sharp (mirrored) or rounded corners. The approach is scalable because N may range from 2 to over 64, limited only by the wafer (substrate) material and size, or D range from a picosecond to well over a nanosecond with currently available substrates.

With switching and optical combining such an optical waveguide array can provide one or several variable delays. In other applications, multiple, simultaneous optical channels can be given accurate increments of differential delay between channels.

An appreciation of the other aims and objectives of the present invention and an understanding of it may be achieved by referring to the accompanying drawings and the description of a preferred embodiment.

DETAILED DESCRIPTION OF THE PREFERRED EMBODIMENT

Figure 1:
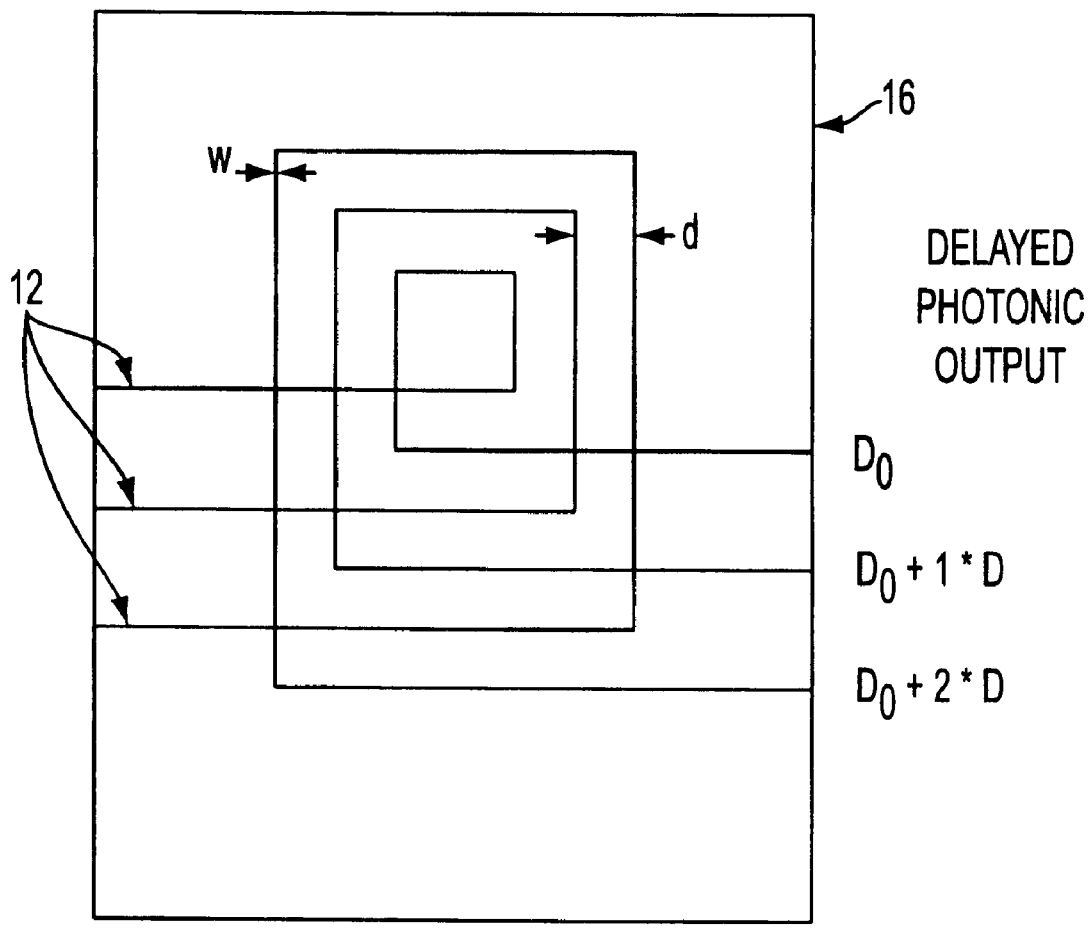
FIG. 1 shows the basic configuration of the invention using three waveguides with waveguide mirrors for sharp 90-degree corners.

The scalable, quantized delay-line architecture based on stylized nested spirals is illustrated in FIG. 1. The delay-line array consists of N optical waveguides 12 (three shown) formed on a suitable substrate or portion of substrate 16 by a process permitting crossovers. For example, silica-on-silicon or optical polymer planar lightwave circuits can be used. The spacing between waveguides is d and the waveguides have width w. There are 2N 90-degree crossings in each light path. For the Figure 90-degree waveguide turning mirrors are assumed at each corner. The shortest path has delay $D_0$, the next path delay $D_0+1*D$, and then $D_0+2*D$. In general the $n^{th}$ delay, $D_n$, is given by $$D_n = D_0 + n*D$$

where n=0 to (N-1) and D is a design constant. When all waveguides have the same spacing, $$D = 10*(d+w)/v$$

where v is the velocity of light in the waveguide at the selected wavelength.

This novel design is permissible because obtuse angle crossings of optical waveguides have a very small loss/scattering cross-section (0.2% per crossing for optical polymers at 1300 nm and 0.3 dB per crossing for silica-on-silicon at 1550 nm). Optical waveguides must not be too close together or there is leakage. Since v is about 20 cm/ns and (d+w) could be as small as 25 $\mu$m, D could be as small as $$D = [(10*25 \ \mu m)/(200 \ mm)]ns = 1.25 \ ps$$

Figure 2:
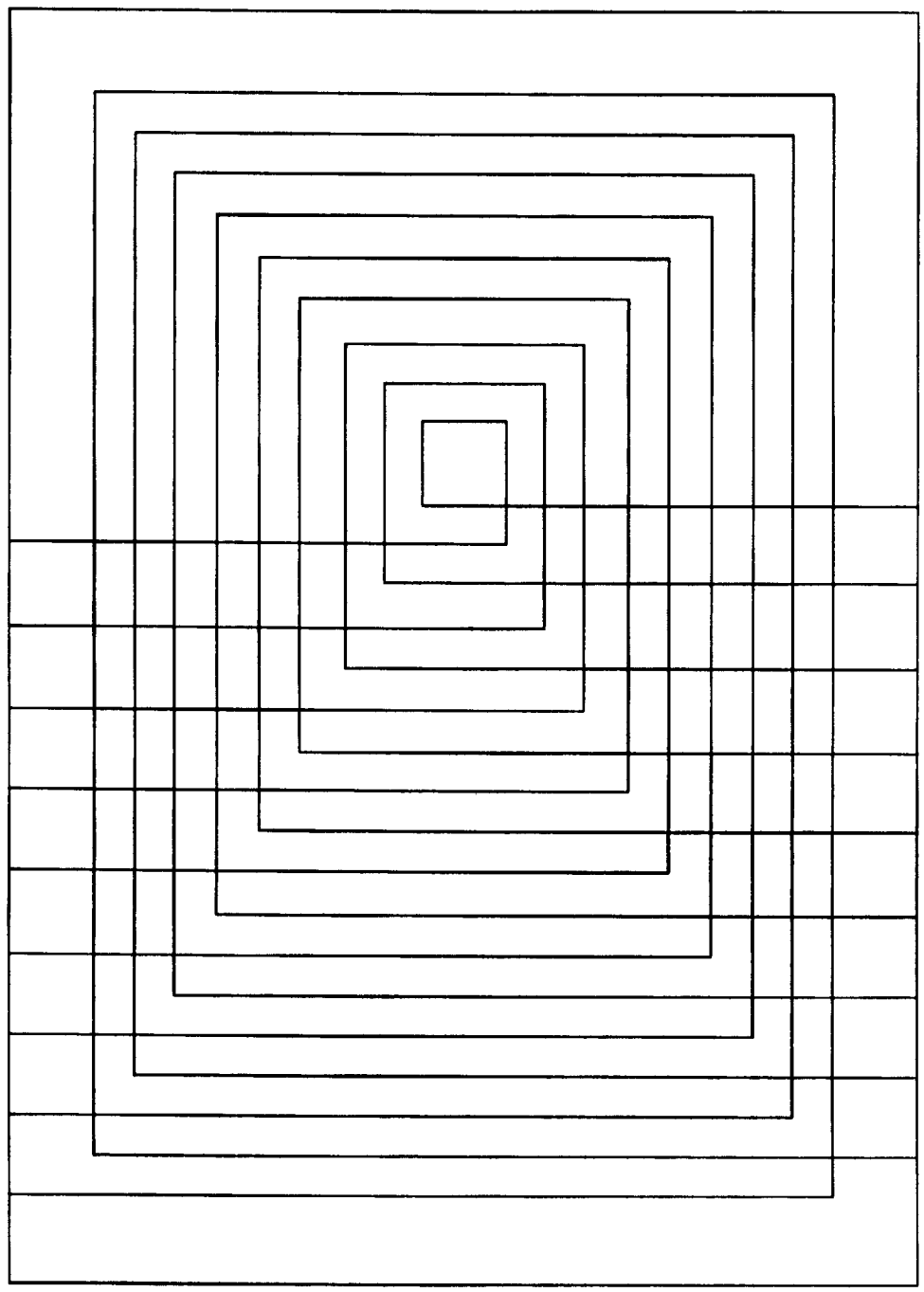
FIG. 2 shows an example of the configuration for nine waveguides and also sharp corners.

FIG. 2 illustrates the case for N=9.

Figure 3:
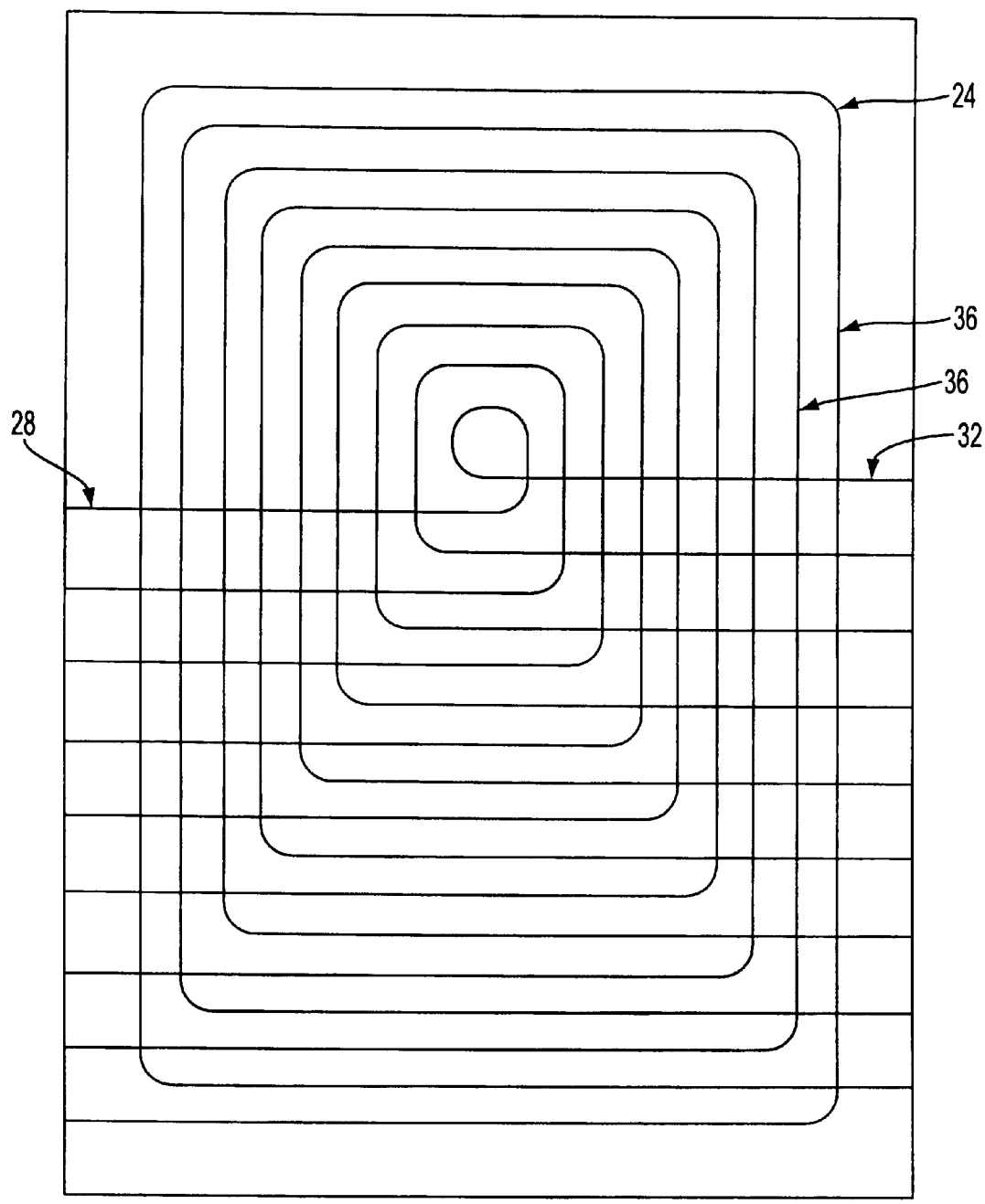
FIG. 3 shows a configuration of nine waveguides with rounded corners.

FIG. 3 shows the case where all of the corners 24 are rounded with radius R. In the figure (d+w) is also set to R and N=9 again. R may not be too small or there is light leakage. R>5 mm is reasonable. For this case $$D = [(10R)/(20 \ cm)] = [(50 \ mm)/(200 \ mm)]ns = 250 \ ps$$

In order to maintain good crossovers the spacing between input 28 and output 32 lines should never be less than R. However, the spacing of other lines 36 may be reduced to d. In this case $$D = [4*R + 6*(d+w)]/v$$

Figure 4:
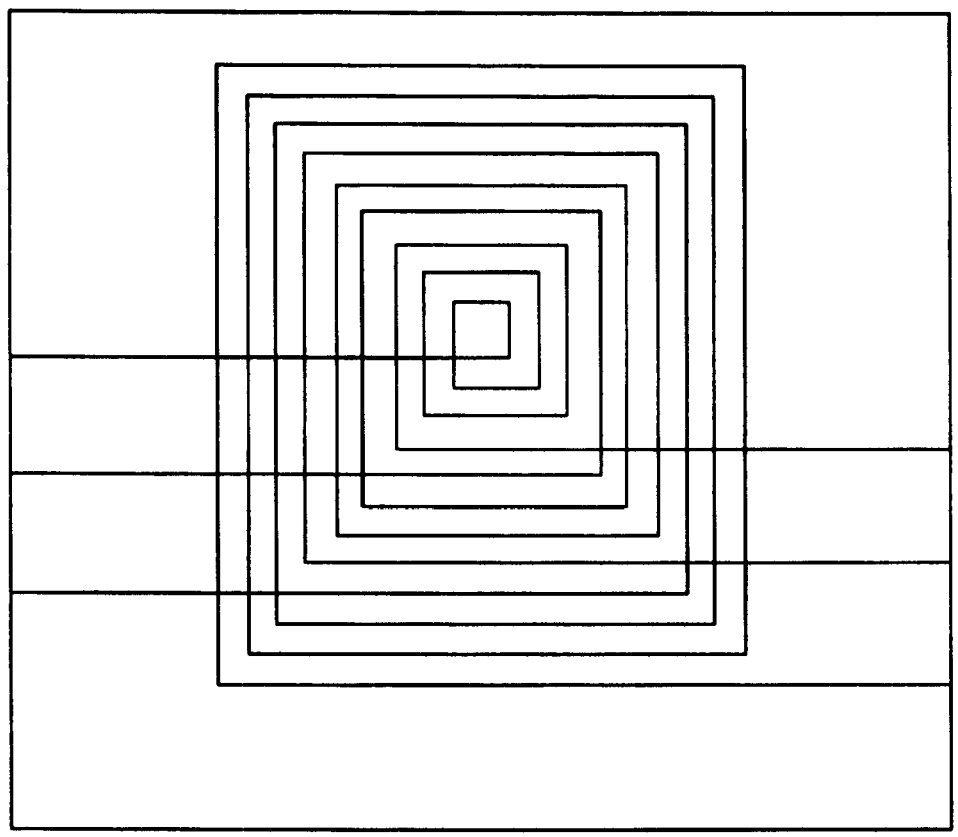
FIG. 4 shows the extension to the use of multiturn spirals with the example of three spirals of three turns each formed with sharp corners.

If larger delay differences are needed between nested delay lines with minimum substrate area, then multiple turns can be used for each delay loop. FIG. 4 illustrates three loops of three turns each. For equal spacing between all waveguides.

$$D = (2+8*L)*L*(d+w)/v$$

where L is the number of turns for each optical loop. There are 2NL crossings for each optical path.

Figure 5:
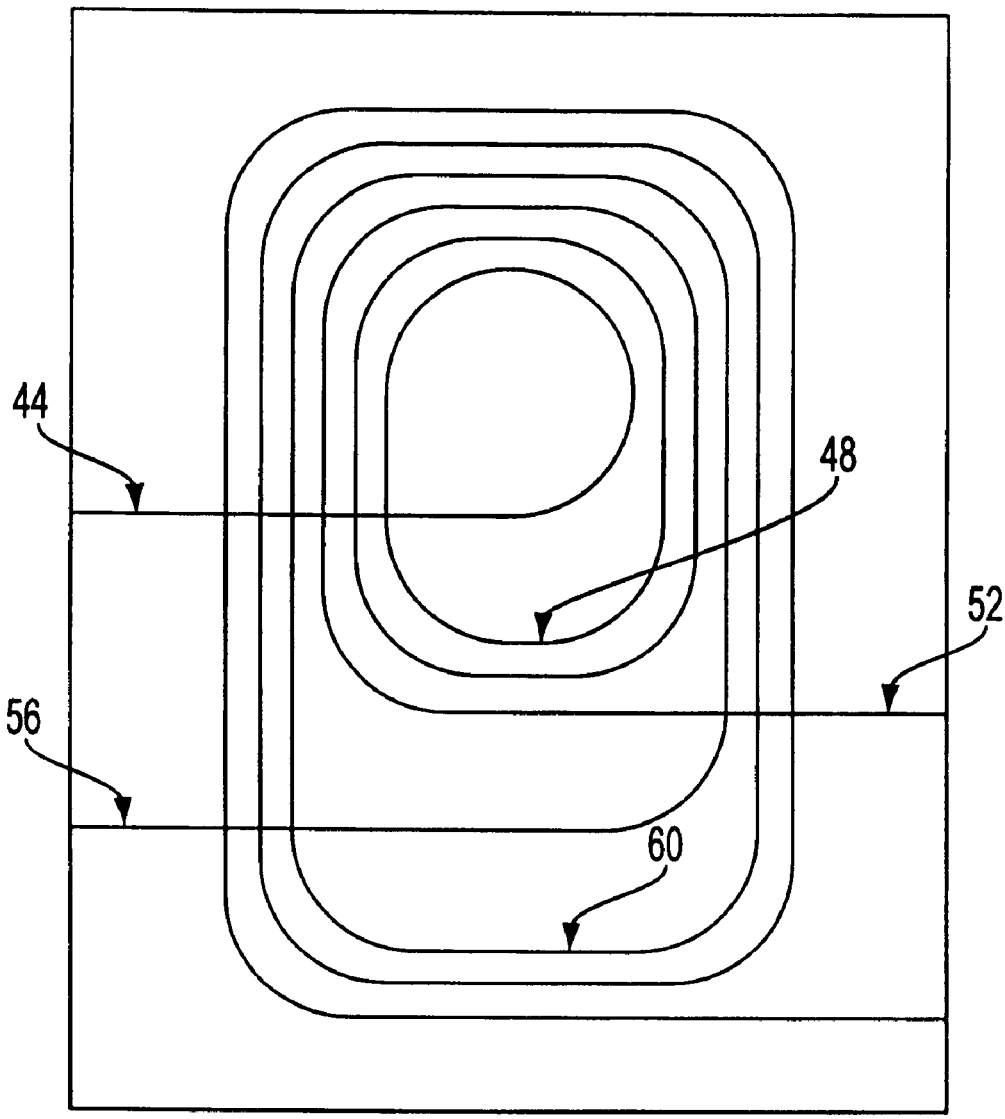
FIG. 5 shows the extension to the use of multiturn spirals with the example of two spirals of three turns each formed with rounded corners.

Rounded corners with radius R can also be used. Spacing of R is needed for any waveguides turning into or out of a crossing. Other waveguides may have a closer spacing of d. This is illustrated in FIG. 5 that shows two loops of three turns each. Waveguide segment 48 turns out of its crossing with input waveguide segment 44, input waveguide segment 56 turns into its crossing with output waveguide segment 52, and waveguide segment 60 turns out of its crossing with input waveguide segment 56. For this case $$D = 2*[2*R + (4*L-1)*(d+w)]*L/v$$

The scalable, quantized, delay-line array has been described with reference to particular embodiments. Other modifications and enhancements can be made without departing from the spirit and scope of the claims that follow.

The numbers used in FIGS. 1–5 are:

12 Optical waveguides
16 Substrate of portion of substrate
24 Rounded corners of radius R
28 Input lines
32 Output lines
36 Example other lines
44 Input waveguide segment
48 Waveguide segment after turn out from crossing
52 Output waveguide segment
56 Input waveguide segment
60 Waveguide segment after turn out from crossing

What is claimed is:

1. A scalable, quantized delay-line array based on nested, generalized spirals, comprising:
   a substrate;
   a first optical waveguide of a first predetermined length formed on said substrate by a process permitting waveguide crossover;
   said first optical waveguide having a first input line and a first output line;
   at least one additional optical waveguide of a second predetermined length formed on said substrate by a process permitting waveguide crossover;
   each of said additional waveguides having an input end and an output end;
   each of said additional waveguides having an input line; said input line being a portion of the waveguide extending from said input end to a corner;
   each of said additional waveguides having an output line; said output line being a portion of the waveguide extending from said output end to a corner;
   means for imparting a delay to said optical input by said first optical waveguide; and
   means for imparting a change of a delay to said optical input when switched from said first optical waveguide to said additional optical waveguide.

2. A scalable, quantized delay-line array based on nested, generalized spirals as described in claim 1 wherein the substrate is selected from the group consisting of silica-on-silicon or other optically transparent semiconductor and optical polymer material.

3. A scalable, quantized delay-line array based on nested, generalized spirals as described in claim 1, wherein the change in delay imparted to the optical signal when switched from the first optical waveguide to a subsequent additional optical waveguide is governed by a fixed design constant, D.

4. A scalable, quantized delay-line array based on nested, generalized spirals as described in claim 1, wherein the delay line architecture is based on stylized nested spirals, thereby conserving space on said substrate.

5. A scalable, quantized delay-line array based on nested, generalized spirals as described in claim 4, wherein the spirals have substantially right angle corners formed using waveguide mirror techniques.

6. A scalable, quantized delay-line array based on nested, generalized spirals as described in claim 5, wherein the means for imparting a change in delay, D, to said optical input by a change to an additional optical waveguide is governed by an equation $D=10*(d+w)/v$ wherein:
   d is a spacing between waveguides;
   w is a waveguide width; and
   v is a velocity of light in the waveguide at the selected wavelength.

7. A scalable, quantized delay-line array based on nested, generalized spirals as described in claim 4, wherein the spirals have quarter-circular corners of radius R and R is large enough to prevent significant radiative losses.

8. A scalable, quantized delay-line array based on nested, generalized spirals as described in claim 7, wherein a spacing between waveguides is at least R.

9. A scalable, quantized delay-line array based on nested, generalized spirals as described in claim 7, wherein a spacing between the input line and the output line is R and the spacing between other segments of waveguide is less than R and the means for imparting a change of a delay, D, to said optical signal by an additional optical waveguide is governed by an equation $D=(4*R+6*(d+w))/v$ wherein:
   d is a spacing between waveguides;
   w is a waveguide width; and
   v is a velocity of light in the waveguide at the selected wavelength.

10. A scalable, quantized delay-line array based on nested, generalized spirals as described in claim 4, wherein the spirals have quarter-circular corners of radius R and R is at least 5 millimeters.

11. A scalable, quantized delay-line array based on nested, generalized spirals as described in claim 4, wherein multiple turns are used for each waveguide; thereby increasing the length of the waveguide which may be disposed upon a substrate of a predetermined size; and thereby increasing the length of delay which the waveguide may impart to an optical input source.

12. A scalable, quantized delay-line array based on nested, generalized spirals as described in claim 11, wherein the spirals have substantially right angle corners formed using waveguide mirror techniques and the means for imparting a change of delay, D, to said optical input by an optical waveguide is governed by an equation $D=(2+8*L)*L*(d+w)/v$ wherein:
   L is a number of turns for the waveguide;
   d is a spacing between waveguides;
   w is a waveguide width; and
   v is a velocity of light in the waveguide at the selected wavelength.

13. A scalable, quantized delay-line array based on nested, generalized spirals as described in claim 11, wherein the spirals have quarter-circular corners of radius R and R is large enough to prevent significant radiative losses.

14. A scalable, quantized delay-line array based on nested, generalized spirals as described in claim 13, wherein a spacing between waveguides turning into or out of a crossover is at least R.

15. A scalable, quantized delay-line array based on nested, generalized spirals as described in claim 13, wherein a spacing between waveguides other than those turning into or out of a crossover is less than R.

16. A scalable, quantized delay-line array based on nested, generalized spirals as described in claim 13, wherein the means for imparting a change of delay, D, to said optical input by an optical waveguide comprises an equation $D=2*[2*R+(4*L-1)*(d+w)]*1/v$ wherein:
   L is a number of turns for the waveguide;
   R is a spacing between waveguides turning into or out of a crossover;
   d is a spacing between waveguides other than those turning into or out of a crossover;

w is a waveguide width;

v is a velocity of light in the waveguide at the selected wavelength.

17. A scalable, quantized delay-line array based on nested, generalized spirals as described in claim 11, wherein the spirals have quarter-circular corners of radius R and R is at least 5 millimeters.

18. A scalable, quantized delay-line array based on nested, generalized spirals as described in claim 1, wherein means for imparting the delay, $D_n$ to the optical input by the $n^{th}$ optical waveguide is governed by an equation $D_n = D_0 + n*D$ wherein:

n is an index indicating ordered waveguide in use;

D is a design constant; and $D_0$ is a delay through the first optical waveguide.

19. A scalable, quantized delay-line array based on nested, generalized spirals as described in claim 1, further comprising:

means for connecting the delay lines to a means for switching an optical input source between the first optical waveguide and the additional optical waveguide;

means for combining all inputs to a single output; and means for switching each input to selected outputs.

* * * * *